United States Patent [15] 3,649,893
Lajoie [45] Mar. 14, 1972

[54] SYNCHRONIZED DRIVER FOR ELECTRICAL UTILIZATION DEVICES

[72] Inventor: Peter A. Lajoie, Chelmsford, Mass.
[73] Assignee: Allegheny Ludlum Industries, Inc., Brackenridge, Pa.
[22] Filed: Aug. 11, 1970
[21] Appl. No.: 62,843

[52] U.S. Cl..............................318/119, 318/122, 318/128, 318/132
[51] Int. Cl. ........................................................H02k 33/00
[58] Field of Search .......................................318/37–38, 41, 318/119, 122, 129; 323/135, 229–323, 22; 58/23; 310/12; 307/225–227, 234

[56] References Cited

UNITED STATES PATENTS

| 3,541,429 | 11/1970 | Martin | 323/22 SC X |
| 3,562,625 | 2/1971 | Van den Broek | 323/22 SC X |
| 3,519,917 | 7/1970 | Martin | 323/22 |
| 3,538,420 | 11/1970 | Klein | 321/5 |
| 3,105,158 | 9/1963 | Nichols | 307/225 |
| 2,873,388 | 2/1959 | Trumbo | 307/226 X |
| 3,261,990 | 7/1966 | Huang | 307/227 |
| 3,555,810 | 1/1971 | Meitinger | 58/23 |
| 3,555,380 | 1/1971 | Hings | 310/12 |

Primary Examiner—Laramie E. Askin
Assistant Examiner—Ulysses Weldon
Attorney—Brown, Murray, Flick & Peckham

[57] ABSTRACT

Apparatus for alternately energizing two electrical utilization devices such as linear motors, or two windings around a single linear motor armature, in such a manner so as to produce a reciprocating motion. One linear motor is energized for a given period of time, followed by a time elapse; whereupon the second linear motor is energized for the same time period and the cycle repeats. Synchronization of the two linear motors is achieved in one embodiment of the invention by counting or integrating the zero crossings of an applied alternating current waveform. Alternatively, a single linear motor can be energized for predetermined time intervals separated by fixed time periods, in which case the armature of the linear motor will ordinarily be returned to its starting position by a spring or the like.

10 Claims, 8 Drawing Figures

INVENTOR.
PETER A. LAJOIE
By
Brown, Murray, Flick & Peckham
Attorneys

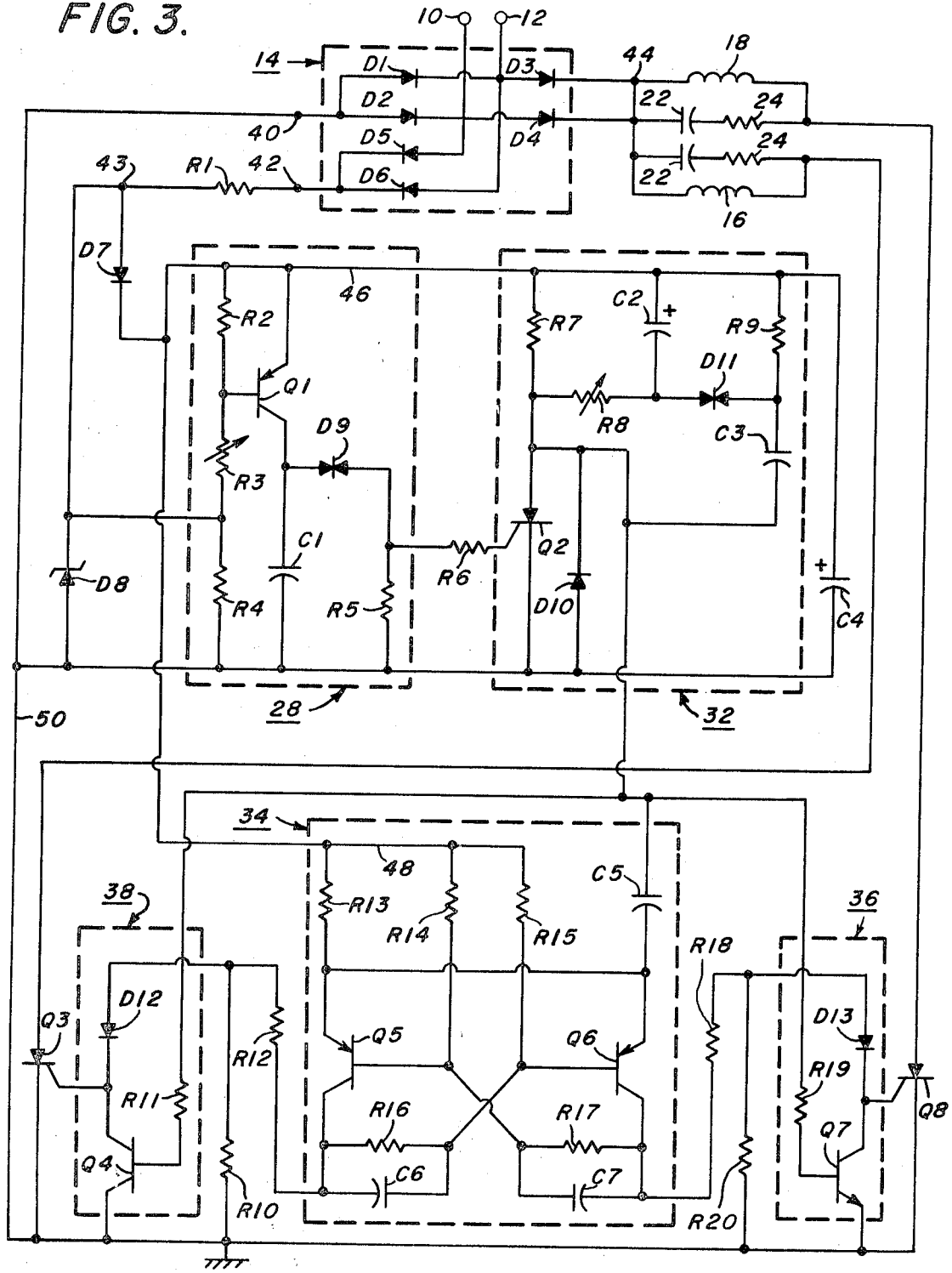

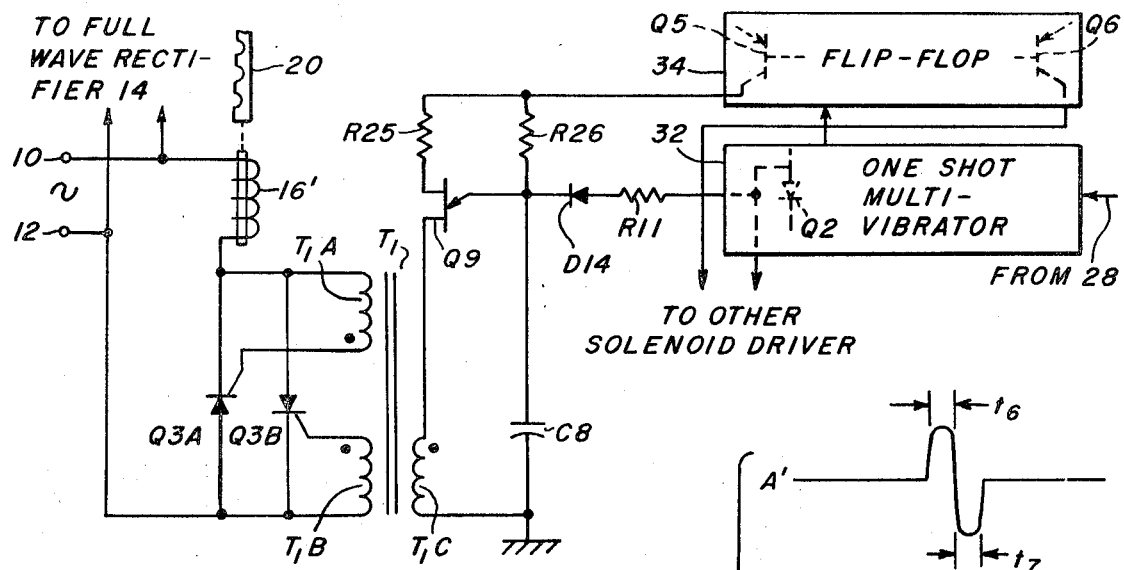
FIG. 6A.
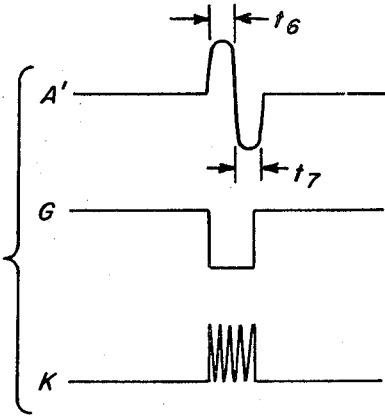
FIG. 6B.
FIG. 7.
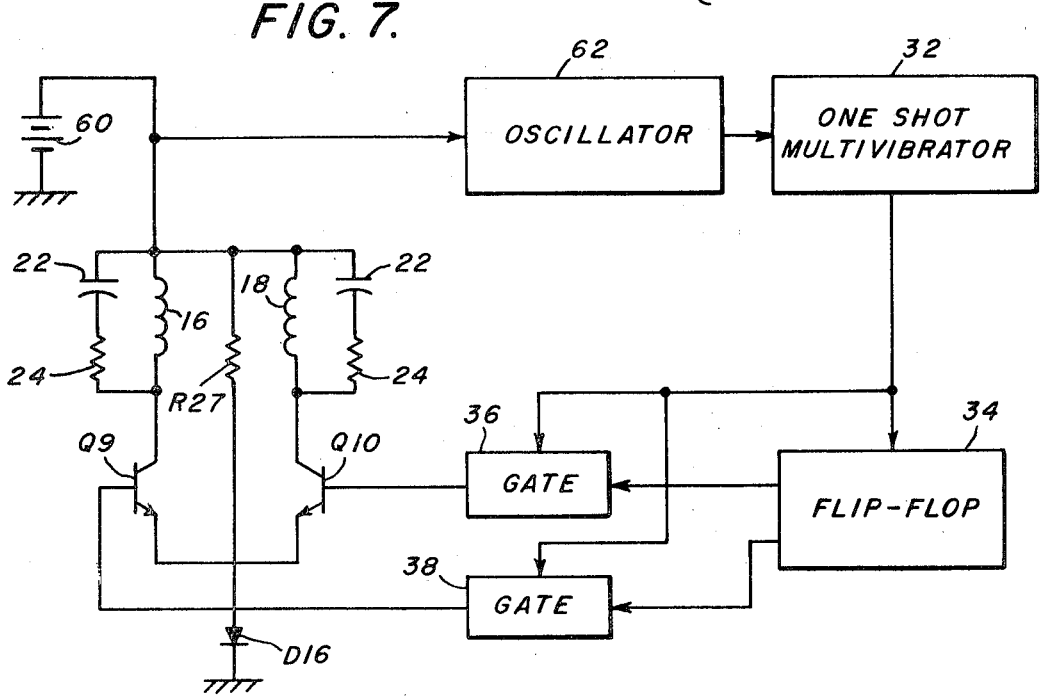
INVENTOR.
PETER A. LAJOIE

SYNCHRONIZED DRIVER FOR ELECTRICAL UTILIZATION DEVICES

BACKGROUND OF THE INVENTION

There are many applications where a reciprocating motion of a member is required such as, for example, the reciprocating blade of a grass or hedge shear. This reciprocating motion can be, and has been, produced by a rotating electric motor and cams or linkages for converting the rotary motion of the motor into reciprocating motion. However, this type of drive is subject to wear, is expensive, and requires lubrication. Furthermore, the use of a rotating motor can make the device somewhat bulky. Other applications for reciprocating motion include jigsaws, sewing machines, impact grinders and the like, most of which have heretofore utilized a rotary motor together with means for translating the rotary motion into reciprocating motion.

SUMMARY OF THE INVENTION

While the present invention can be used for periodically energizing any electrical utilization device, it finds particular utility as apparatus for directly generating reciprocating motion with the use of linear motors, preferably solenoids energized by a conventional 60-cycle alternating current voltage source. In order to energize two solenoids to effect reciprocating motion, it is necessary to apply power alternately to the energizing coils of the solenoids in a pulsing technique. That is, the first solenoid must be energized while the second is deenergized, and then the second energized while the first is deenergized. This requires a timing or synchronizing circuit for controlling the application of power to the solenoids; and this timing circuit must be simple and inexpensive in construction for most applications.

In accordance with the present invention, synchronization is achieved by counting the zero crossings of the applied alternating current voltage source for the solenoids and for generating an output pulse each time the alternating current voltage source passes through a predetermined number of cycles. These pulses are then used to alternately cause energization of two solenoids or, in the case of one solenoid, to energize that solenoid periodically, the armature of the single solenoid being returned to its starting position by a return spring.

Specifically, the apparatus of the invention includes at least one solenoid, means for rectifying an applied alternating current voltage source, at least one normally open switch device for connecting said solenoid to a source of driving potential, means coupled to the rectifying means for producing an output pulse each time the applied alternating current voltage source passes through a predetermined number of cycles, and means for closing said switch device to energize the solenoid upon the occurrence of a pulse from said means for producing pulses.

In the case of two solenoids, two normally open switch devices, preferably thyristors, are needed, one for each solenoid. Furthermore, in the case of two solenoids, one of the thyristors is fired upon the occurrence of every other output pulse from the means for producing pulses while the other thyristor is fired upon the occurrence of the remaining output pulses. In this manner, the two solenoids are energized alternately for predetermined time intervals.

In one embodiment of the invention, the means for producing an output pulse each time the applied alternating current voltage source passes through a predetermined number of cycles comprises a transistor switch device which conducts each time there is a zero voltage occurrence of the rectified output of said rectifying means. During conduction of this transistor, a controlled charge increment is entered into a capacitor. Upon receiving a predetermined number of charge increments, the capacitor reaches a specified voltage level, thereby causing breakdown of a circuit element to produce an output pulse which is applied to a one-shot multivibrator or the like to produce a pulse of constant and predetermined width which is used to trigger the aforesaid thyristor.

DESCRIPTION OF THE PREFERRED EMBODIMENTS

The above and other objects and features of the invention will become apparent from the following detailed description taken in connection with the accompanying drawings which form a part of this specification, and in which:

FIG. 1 is a block diagram of the solenoid driver system of the invention;

FIG. 2 comprises waveforms illustrating the operation of the circuit of FIG. 1;

FIG. 3 is a detailed schematic circuit diagram of the circuit of FIG. 1;

FIG. 6A illustrates an embodiment of the invention wherein the solenoid is driven directly by the alternating current applied voltage rather than by the output of a rectifier;

Figure 1:
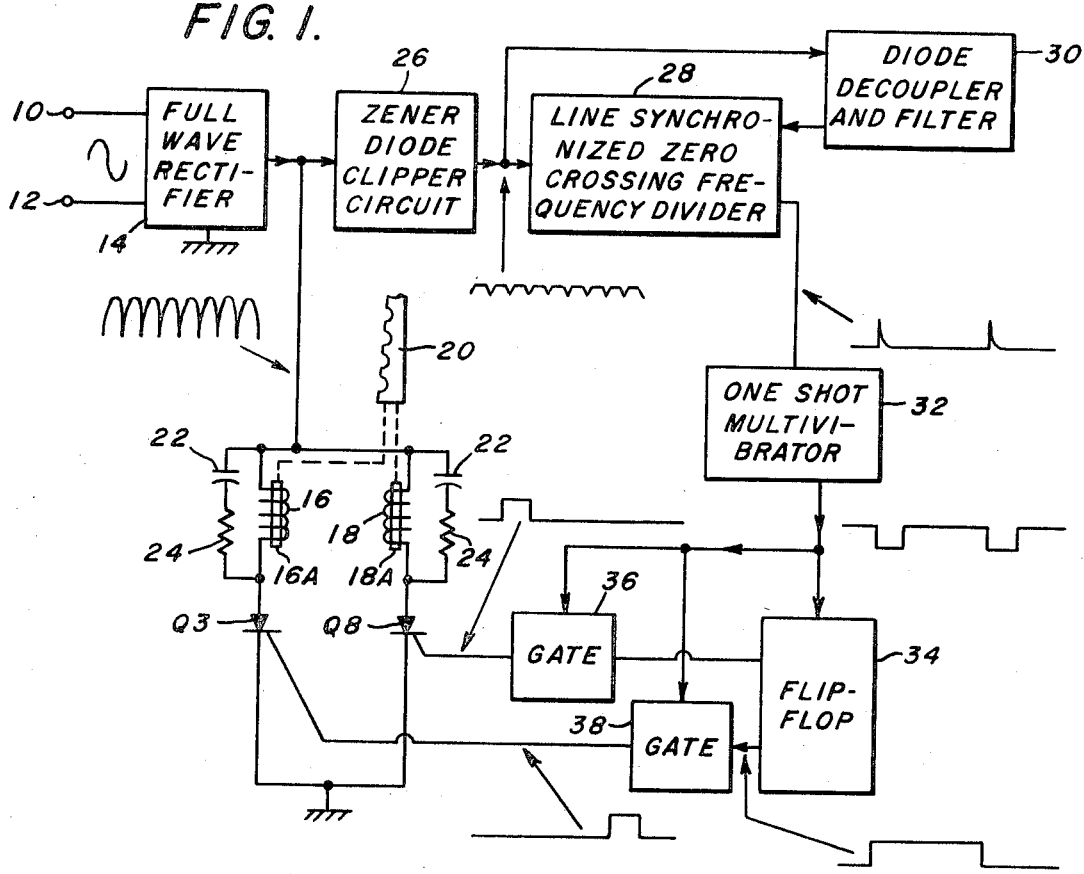
Figure 2:
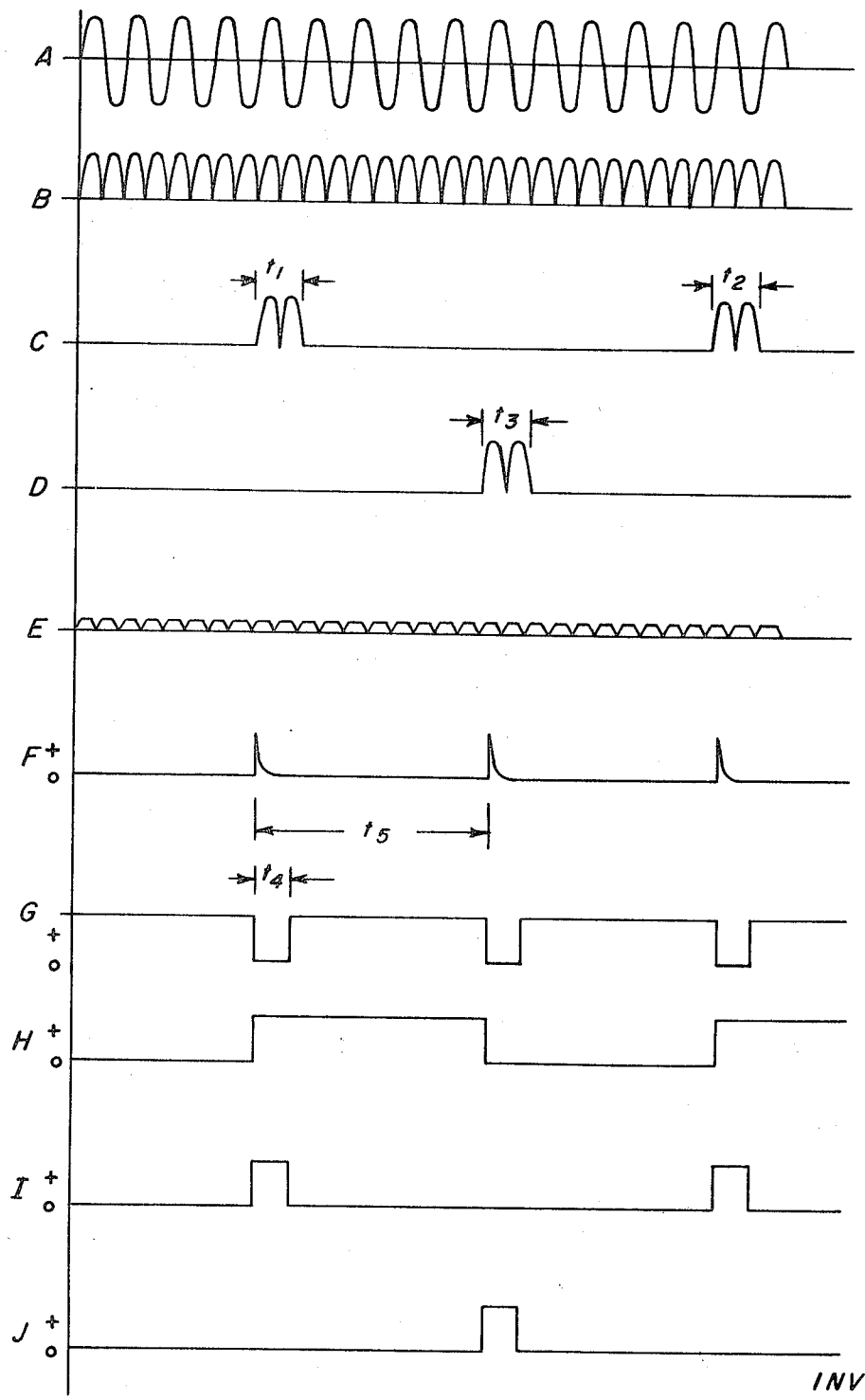

FIG. 6B comprises waveforms illustrating the operation of the circuit of FIG. 6A; and FIG. 7 illustrates an embodiment of the invention wherein the primary source of power for the solenoid means is a battery With reference now the drawings, and particularly to FIGS. 1 and 2, the circuit shown includes a pair of input terminals 10 and 12 to which a source of 115-volt alternating current is applied. The voltage applied to the terminals 10 and 12 appears as waveform A in FIG. 2. This voltage is rectified in a full-wave rectifier 14 to produce waveform B in FIG. 2. Portions of this waveform, appearing as waveforms C and D in FIG. 2, are then used to energize two solenoids 16 and 18 having armatures 16A and 18A connected, for example, to the movable cutter element 20 of a grass or hedge shear. A capacitor 22 and resistor 24 are connected in shunt with each of the solenoids 16 and 18; while the ends of the solenoids opposite the rectifier 14 are connected to common through a pair of normally open switch devices comprising semiconductive controlled rectifiers or thyristors Q3 and Q8. The windings of solenoids 16 and 18 are such that when solenoid 16 is energized (times $t_1$ and $t_2$ on waveform C), the blade 20 will be caused to move in one direction; whereas when solenoid 18 is energized (time $t_3$ on waveform D), the blade will move in the opposite direction.

In order to synchronize energization of the two solenoids 16 and 18, the full-wave rectified output of rectifier 14, comprising waveform B in FIG. 2, is applied to a Zener diode clipper circuit 26 which limits the positive excursions of waveform B to produce waveform E of FIG. 2. This waveform is then applied to a line synchronized zero crossing frequency divider 28 which will produce an output pulse (waveform F in FIG. 2) for a selectable multiple of each time the waveform A crosses the zero axis. The manner in which the circuit 28 operates will hereinafter be described in detail. The output of the Zener diode clipper circuit 26 is also applied to a diode decoupler and filter 30 which provides a source of B+ driving voltage for the circuit 28.

The circuit 28, therefore, outputs a pulse in synchronization with the line voltage zero crossings but at a rate which is some division of the line frequency. Since the line voltage goes through a zero crossing, the output of the Zener diode clipper circuit 26 produces a negative-going pulse at each zero crossing. These negative-going pulses are counted or integrated in the circuit 28 in a manner hereinafter described. The synchronization is necessary for two reasons. First, it enables the pulses which fire the rectifiers Q3 and Q8 to be of constant width and separated by fixed time intervals; and, secondly, it causes the rectifiers Q3 and Q8 to be fired just after the line voltage passes through zero, with the result that the rate of rise of current (i.e., $di/dt$) through the rectifiers is minimized as is the generation of radio frequency noise.

The output pulses from circuit 28 comprising waveform F in FIG. 2 are applied to a one-shot multivibrator 32 which produces a pulse of specified width each time a pulse in waveform F is applied thereto. Thus, the output of the one-shot multivibrator 32 appears as waveform G in FIG. 2. The pulses in waveform G at the output of one-shot multivibrator 32 are applied to a flip-flop circuit 34 which will change stable states each time a pulse is applied thereto from the one-shot multivibrator 32. Hence, the output of the flip-flop circuit 34 will appear as waveform H in FIG. 2. The pulses at the output of the one-shot multivibrator 32 are also applied to two gates 36 and 38, one of which connects one side of the flip-flop 34 to the control electrode of rectifier Q8 and the other of which connects the other side of the flip-flop to the control electrode of rectifier Q3. Waveform H in FIG. 1 comprises the output of one side of the flip-flop 34, it being understood that the output at the other side of the flip-flop is 180° out of phase with respect to waveform H.

The gates 36 and 38 are enabled only when the output of the flip-flop applied thereto is positive. When a pulse in waveform F arrives at gate 36, it will be enabled; whereas, when the next pulse in waveform F arrives at gate 38, it will be enabled while gate 36 is disabled. The result is that the output of gate 36 will appear as waveform I in FIG. 2; whereas the output of gate 38 will appear as waveform J. Note that the pulses in waveforms I and J are of constant width by virtue of the one-shot multivibrator 32; the pulses in waveforms I and J are separated by fixed time intervals; and the pulses in waveform J are intermediate those in waveform I. Hence, by applying the two waveforms I and J to the control electrodes of rectifiers Q3 and Q8, respectively, they will fire alternately to alternately energize the solenoids 16 and 18 and cause the blade 20 to move backwardly and forwardly in a reciprocating motion. Furthermore, since the leading edges of the pulses in waveforms I and J will necessarily coincide with zero crossings of the applied waveform, the rectifiers Q3 and Q8 are fired shortly after the zero crossing resulting in nominal $di/dt$ in the rectifiers with very little radio frequency noise thereby generated.

The details of the circuitry of FIG. 1 are shown in FIG. 3. The rectifier 14 includes six diodes D1–D6 and is designed to produce a common negative potential at terminal 40 and two isolated positive potentials at terminals 42 and 44, respectively. The need for this isolation will be evident as the description proceeds. The positive potential source at terminal 42 is applied through resistor R1 to a Zener diode D8 which clips the applied potential to a usable value such that it appears as waveform E in FIG. 2. Waveform E appears at point 43, the junction of diode D7, resistor R1 and Zener diode D8. The potential on the cathode of diode D7 is applied to lead 46 and lead 48 and comprises a source of B+ driving potential for the frequency divider 28, one-shot multivibrator 32 and flip-flop 34. The negative terminal 40 is connected to a common bus 50 and comprises the other or ground terminal of the driving potential source for the various circuits of the invention. Capacitor C4 acts to smooth the applied B+ driving potential source; while diode D7 serves to decouple the filter so as not to affect the synchronizing spikes.

The synchronizing spikes, comprising those portions of waveform E in FIG. 2 which intersect and cross the zero axis are applied via variable resistor R3 to the base of PNP transistor Q1. The gain of Q1 and a bias network made up of resistors R2, R3 and R4 determine the charge which enters a capacitor C1 for each synchronizing spike. For each succeeding synchronizing spike, the voltage on capacitor C1 is increased until a three-layer bilateral trigger diode D9 switches ON, thereby dumping the charge across capacitor C1 into resistors R5 and R6 and the gate of thyristor Q2. This action initiates conduction in thyristor Q2 and capacitor C1 begins to charge up again. In this manner, the capacitor C1 acts as an analog counter with resistor R3 being variable to select the number of input pulses required to provide a single output pulse.

With thyristor Q2 conducting, capacitor C2 begins to charge up through resistor R8. When the voltage across capacitor C2 is such that a second three-layer diode D11 breaks down, a negative spike is applied to the anode of thyristor Q2, thereby turning the thyristor OFF. The circuitry just described is in the one-shot multivibrator 32 shown in FIG. 1; the time period that thyristor Q2 is ON determining the width of the zero portion ($t_4$) of the pulses in waveform G. At the same time, the time required to charge the capacitor C1 determines the period ($t_5$) of the pulses in waveform G. Resistor R7 connects the anode of thyristor Q2 to the positive bus 46; while resistor R9 connects one terminal of the three-layer diode D11 to this same positive bus 46. Diode D10 acts to clip excess negative voltage appearing at the anode of thyristor Q2; while capacitor C3 connects resistor R9 to the anode of thyristor Q2.

The anode of thyristor Q2, comprising the output of the one-shot multivibrator 32 shown in FIG. 1, is connected through resistors R11 and R19 to the bases of transistors Q4 and Q7 in the gate circuits 36 and 38. In addition, the output of the one-shot multivibrator is applied through capacitor C5 to the emitters of transistors Q5 and Q6 in the flip-flop or multivibrator 34. As shown, the base of transistor Q5 is connected through resistor R17 and capacitor C7 to the collector of transistor Q6. Similarly, the base of transistor Q6 is connected through resistor R16 and capacitor C6 to the collector of transistor Q5. The bases of transistors Q5 and Q6 are also connected to the positive bus 48 through resistors R14 and R15; while the emitters of these same transistors are connected to the positive bus 48 through resistor R13.

With the arrangement shown, the transistors Q5 and Q6 will alternately conduct each time a pulse in waveform G of FIG. 2 is applied to their emitters. When transistor Q5 conducts, for example, it draws current through resistors R10 and R12, thereby raising the potential on the anode of diode D12 and causing transistor Q4 to conduct during the positive portion of waveform G as applied to the base of Q4. The transistor Q7, however, will not conduct even though a positive pulse is applied to its base since the potential on the anode of diode D13 is essentially at ground potential. However, upon the occurrence of the next conduction interval of thyristor Q2 of the one-shot multivibrator 32, transistor Q6 will turn ON while transistor Q5 cuts OFF, thereby, during the time Q7 is OFF, raising the positive potential on the anode of D13 to cause a positive pulse to be applied to the gate electrode of thyristor Q8 and cause it to conduct. Thyristors Q3 and Q8, in turn, are connected in series respectively with the solenoids 16 and 18 back to positive terminal 44, thereby causing an alternate energization of these solenoids. (See waveforms C and D in FIG. 2.) The capacitor 22 and resistor 24 across each solenoid serve to allow the thyristors to turn OFF by providing a current path for stored energy in the solenoids. The six-diode rectification D1–D6 decouples the filtering effects of the capacitor 22 from the synchronizing waveform.

Figure 4:
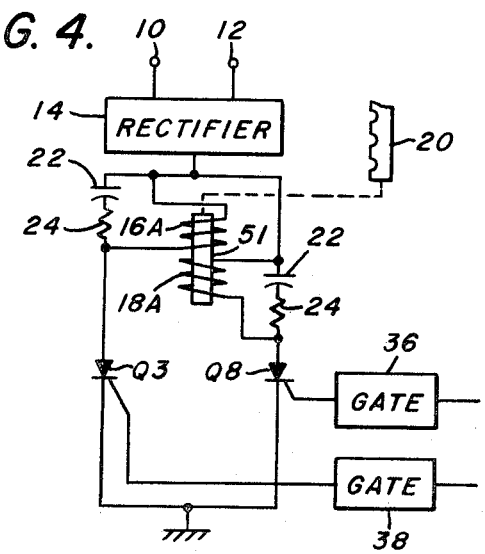
FIG. 4 illustrates an alternative embodiment of the invention wherein two windings are provided around a single solenoid core.

In FIG. 4, an embodiment of the invention is shown wherein a single solenoid armature 51 is provided with two windings 16A and 18A wound in opposite directions such that when thyristor Q3 fires the armature 51, which is connected to the blade 20, will move in one direction; whereas when thyristor Q8 conducts the other winding 18A will be energized to cause the armature 51 to move in the opposite direction. Otherwise, the operation of the circuit is essentially the same as that shown in connection with FIGS. 1–3. Elements in FIG. 4 which correspond to those shown in FIG. 1 are identified by like reference numerals.

Figure 5:
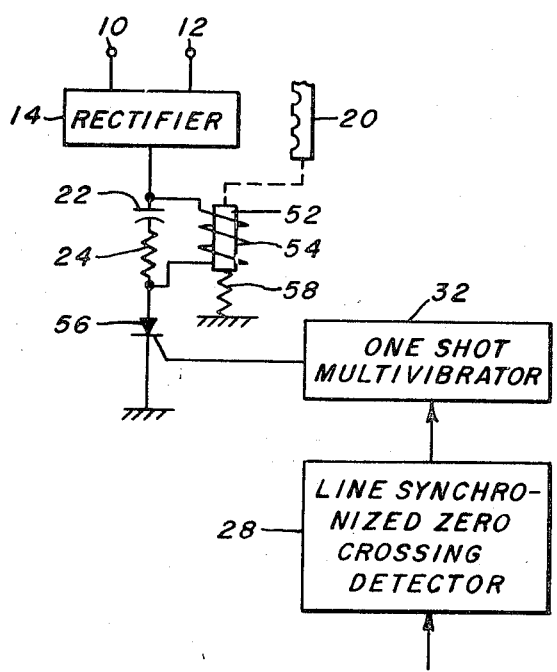
FIG. 5 illustrates an embodiment of the invention wherein one solenoid is employed together with a spring return for achieving a reciprocating motion.

In FIG. 5, another embodiment of the invention is shown wherein only a single solenoid armature and single coil are employed, together with a spring return for the armature. Thus, a single armature solenoid 52 is utilized having a single winding 54 thereon which, as in the embodiment shown in FIG. 1, has a capacitor 22 and resistor 24 in shunt therewith. The single winding 54 is connected at one end to the output of rectifier 14 and its other end through a thyristor 56 to ground.

The gate electrode of the thyristor 56 is connected directly to the output of the one-shot multivibrator 32 since, in this case, it is no longer necessary to synchronize alternate energization of two solenoids. The solenoid armature 52, which is connected to the movable blade 20, for example, is returned to its starting position after the coil 54 is energized by a return spring 58. As will be understood, in order to obtain the same rate of reciprocation of the blade 20 as in the system of FIGS. 1–3, it will be necessary to adjust resistor R3 such that the spacing between pulses at the output of the one-shot multivibrator 32 will be doubled.

In FIG. 6A a further embodiment of the invention is shown wherein a solenoid 16', for example, is energized from the 115-volt alternating current source applied to terminals 10 and 12 rather than the output of rectifier 14. In this case, it is necessary to energize the solenoid 16' from two thyristors Q3A and Q3B connected back-to-back between one end of the solenoid and terminal 12, the other end of the solenoid being connected to terminal 10.

The gate electrode of thyristor Q3A is connected to one end of a winding $T_1A$ on transformer $T_1$; while the other end of winding $T_1A$ is connected to the cathode of thyristor Q3A. Similarly, the gate electrode of thyristor Q3B is connected to one end of winding $T_1B$ on transformer $T_1$, the other end of the winding being connected to the cathode of thyristor Q3B. The primary winding $T_1C$ on transformer $T_1$ is connected at one end to common and its other end to one base of a unijunction transistor Q9. The emitter of unijunction transistor Q9 is connected through diode D14 and resistor R11 to the anode of element Q2 in one-shot multivibrator 32.

In the operation of the circuit of FIG. 6A, the unijunction transistor Q9 is permitted to oscillate at about a 1 kilohertz frequency or greater whenever the side of the flip-flop 34 to which it is connected is ON and element Q2 in multivibrator 34 is ON also. The high frequency is needed to couple through the pulse transformer $T_1$ to both thyristors so that they will go ON in sequence. With element Q2 OFF in the one-shot multivibrator 32, unijunction transistor Q9 saturates, providing no pulses to the transformer $T_1$. When element Q2 is ON, however, resistor R26 cannot sustain saturation of unijunction transistor Q9. Therefore, the unijunction transistor turns OFF and capacitor C8 charges up and fires unijunction transistor Q9. The repeated charging and discharging of capacitor C8 through transistor Q9 provides the pulses to the transformer $T_1$ via primary winding $T_1C$. Of course, this occurs only so long as an ON signal appears at the side of the flip-flop 34 connected to the unijunction transistor Q9 through resistors R25 and R26. When the other side of the flip-flop 34 is ON, this signal can be used to actuate a second solenoid as in FIG. 1, for example. The diode D14 prevents discharge of capacitor C8 through resistor R11 when an ON signal appears at the output of the one-shot multivibrator 32. When the output of the one-shot multivibrator 32 is again OFF, unijunction transistor Q9 saturates and the pulses cease.

The operation of the circuit of FIG. 6A is illustrated in FIG. 6B wherein waveform A' illustrates the voltage across the solenoid 16'. During time $t_6$, thyristor Q3A is ON; whereas during time $t_7$, thyristors Q3B is ON. This occurs when a pulse appears at the output of one-shot multivibrator 32 as illustrated by a pulse in waveform G, thereby causing high frequency oscillations to be applied through transformer $T_1$ to the gate electrodes of thyristors Q3A and Q3B. These high frequency oscillations are illustrated by waveform K in FIG. 6B.

With reference now to FIG. 7, still another embodiment of the invention is shown in which elements corresponding to those of FIG. 1 are identified by like reference numerals. In this case, however, the circuit is driven by a direct current source, such as battery 60, which is connected directly to the solenoids 16 and 18 through bipolar NPN transistors Q9 and Q10. The output of battery 60 is also applied to an oscillator which drives the one-shot multivibrator 32. In this case, the outputs of the gates 36 and 38 act to alternately fire the two transistors Q9 and Q10 to thereby energize the solenoids 16 and 18. Diode D16 and resistor R27 provide a bias to assure good turn-off of the transistors Q9 and Q10. As will be appreciated, the resistance-capacitance network 22, 24 across the solenoid 16 or 18 can be replaced by a diode if desired.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. In combination with a source of driving potential, a linear motor having a reciprocating element and winding means operatively associated with said reciprocating element, means for producing an oscillator voltage, a normally open switch device for connecting the winding means of said linear motor to said source of driving potential, means coupled to said oscillatory voltage producing means for generating an output pulse each time said oscillatory voltage passes through a predetermined number of full half cycles, the frequency of said output pulses being less than the frequency of said oscillatory voltage, and means for closing said switch device upon the occurrence of an output pulse from said means for producing pulses to energize said winding means and cause movement of said reciprocating element.

2. The apparatus of claim 1 wherein said means for producing an oscillatory voltage comprises means for rectifying an applied alternating current source, said source of driving potential for the winding means of said linear motor comprising the output of said rectifying means.

3. The apparatus of claim 1 wherein said source of potential for the winding means of said linear motor comprises said alternating current voltage source.

4. The apparatus of claim 2 wherein said means for producing an output pulse each time said applied alternating current voltage source passes through a predetermined number of cycles is coupled to said rectifying means and comprises a transistor switch device, means for turning said transistor switch device ON each time the output waveform from said rectifying means intersects the zero axis of the waveform, capacitor means coupled to said transistor switch device whereby the capacitor means will charge to a predetermined voltage level after the transistor switch means conducts a predetermined number of times, and means including a breakdown circuit device for discharging said capacitor to produce an output pulse when said predetermined voltage level is reached.

5. The apparatus of claim 4 wherein said switch device comprises a thyristor and including a one-shot multivibrator coupled to the output of said means coupled to said rectifying means for producing firing pulses for the gate electrode of said thyristor.

6. The apparatus of claim 5 wherein there are two linear motors and two thyristors for alternately connecting said linear motors to said source of driving potential, and including a flip-flop circuit connected to the output of said one-shot multivibrator, a first gate circuit connected to one of the two output terminals of said flip-flop and said one-shot multivibrator for applying every other pulse from the one-shot multivibrator to the gate electrode of one of said thyristors, and a second gate circuit connected to the other of the two output terminals of said flip-flop and said one-shot multivibrator for applying the remaining pulses from said one-shot multivibrator to the gate electrode of the other of said thyristors.

7. The apparatus of claim 1 wherein said switch device comprises a semiconductive controlled rectifier.

8. The apparatus of claim 1 wherein there are two linear motors and two normally open switch devices for alternately connecting the winding means of said linear motors to said source of driving potential.

9. The apparatus of claim 1 wherein said linear motor comprises a solenoid including an armature, and a spring device for urging said armature in one direction.

10. The apparatus of claim 1 wherein said linear motor is provided with two oppositely-wound windings and there are two normally open switch devices for alternately connecting the respective ones of said windings to said source of driving potential.

* * * * *